(12) United States Patent
Yang et al.

(10) Patent No.: US 6,661,916 B2
(45) Date of Patent: Dec. 9, 2003

(54) IMAGE PROCESSING METHOD FOR SMOOTHING THE BOUNDARY OF AN IMAGE AREA

(75) Inventors: Po-Chin Yang, Tainan (TW); Chien-Hsing Tang, Taoyuan Hsien (TW); Hsu-Chu Chien, Taipei (TW); Yuan-Guan Lin, Taipei (TW)

(73) Assignee: BenQ Corporation, Tao-Yuan Hsien (TW)

( * ) Notice: Subject to any disclaimer, the term of this patent is extended or adjusted under 35 U.S.C. 154(b) by 556 days.

(21) Appl. No.: 09/731,837

(22) Filed: Dec. 8, 2000

(65) Prior Publication Data

US 2001/0010735 A1 Aug. 2, 2001

(30) Foreign Application Priority Data

Jan. 28, 2000 (TW) .................................. 89101473 A

(51) Int. Cl.⁷ ................................................ G06K 9/00
(52) U.S. Cl. ...................................... 382/167; 358/518
(58) Field of Search ................................ 382/162–167; 358/504–540

(56) References Cited

U.S. PATENT DOCUMENTS 5,335,097 A * 8/1994 Murakami .................. 358/518
5,867,285 A * 2/1999 Hirota et al. ................ 382/167
6,016,354 A * 1/2000 Lin et al. .................... 382/167
6,323,959 B1 * 11/2001 Toyama et al. ............. 358/518
6,549,200 B1 * 4/2003 Mortlock et al. ........... 345/419

* cited by examiner

*Primary Examiner*—Jingge Wu
(74) *Attorney, Agent, or Firm*—Winston Hsu

(57) ABSTRACT

An image processing method of an image processing system. The image processing system has a memory for storing programs and a picture image, and a processor for executing the programs stored in the memory. The picture image has a plurality of pixels. The method has three steps. The first step is to find at least one image area with a predetermined characteristic from the picture image according to a predetermined image area detecting method. The second step is to define a boundary area around the image area according to a predetermined boundary area defining method. The third step is to adjust pixels inside the image area according to a predetermined color adjusting method, and adjust pixels inside the boundary area according to a different but similar color adjusting method so that the color adjustment can be extended from the image area to the boundary area.

11 Claims, 3 Drawing Sheets

IMAGE PROCESSING METHOD FOR SMOOTHING THE BOUNDARY OF AN IMAGE AREA

BACKGROUND OF THE INVENTION

1. Field of the Invention

The invention relates to an image processing method, and more particularly, to an image processing method for smoothing the boundary of an image area.

2. Description of the Prior Art

Please refer to FIGS. 1 and 2. FIG. 1 is a functional block diagram of a prior art image processing system 10. FIG. 2 is a perspective view of a picture image 14 in the image processing system 10. The image processing system 10 comprises a memory 12 for storing programs and a picture image 14, and a processor 16 for executing the programs stored in the memory 12. The picture image 14 comprises a plurality of pixels 18 arranged in a matrix shape. Each of the pixels 18 comprises red, green and blue parameters. The pixels 18 with similar parameters form at least one image area 20.

The purpose of performing an image processing method is to adjust the color of the image area 20 as well as to blend its boundary with the rest of the picture image 14. The image processing method is performed by adjusting red, green and blue parameters of each pixel in the image area 20 according to a predetermined color adjusting method, and then adjusting red, green and blue parameters of each pixel 18 in the picture image 14 according to an image blending method such as a lowpass filtering method or a median filtering method.

However, applying the image blending method throughout the picture image 14 is quite redundant because the purpose of applying the image blending method is only to smooth the boundary of the image area 20. Furthermore, although applying the image blending method can smooth the boundary of the image area 20, it will sacrifice the clarity of images outside the image area 20. In this case, the clarity of the whole picture image 14 is sacrificed since the image blending method is applied throughout the picture image 14.

SUMMARY OF THE INVENTION

It is therefore a primary objective of the present invention to provide an image processing method to solve the above mentioned problems.

Briefly, in a preferred embodiment, the present invention provides an image processing method of an image processing system. The image processing system has a memory for storing programs and a picture image, and a processor for executing the programs stored in the memory. The picture image has a plurality of pixels. The method has three steps. The first step is to find at least one image area with a predetermined characteristic from the picture image according to a predetermined image area detecting method. The second step is to define a boundary area around the image area according to a predetermined boundary area defining method. The third step is to adjust pixels inside the image area according to a predetermined color adjusting method, and adjust pixels inside the boundary area according to a different but similar color adjusting method so that the color adjustment can be extended from the image area to the boundary area.

It is an advantage of the present invention that the second color adjusting method is only applied to the boundary area so that the image not within the boundary area of the image area will be retained.

These and other objects and the advantages of the present invention will no doubt become obvious to those of ordinary skill in the art after having read the following detailed description of the preferred embodiment, as illustrated by the included figures and drawings.

DETAILED DESCRIPTION OF THE PREFERRED EMBODIMENT

Figure 1:
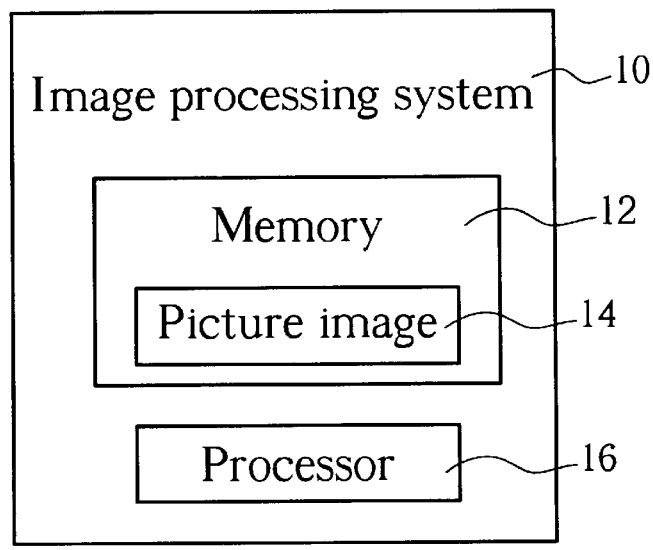
FIG. 1 is a functional block diagram of a prior art image processing system.
Figure 2:
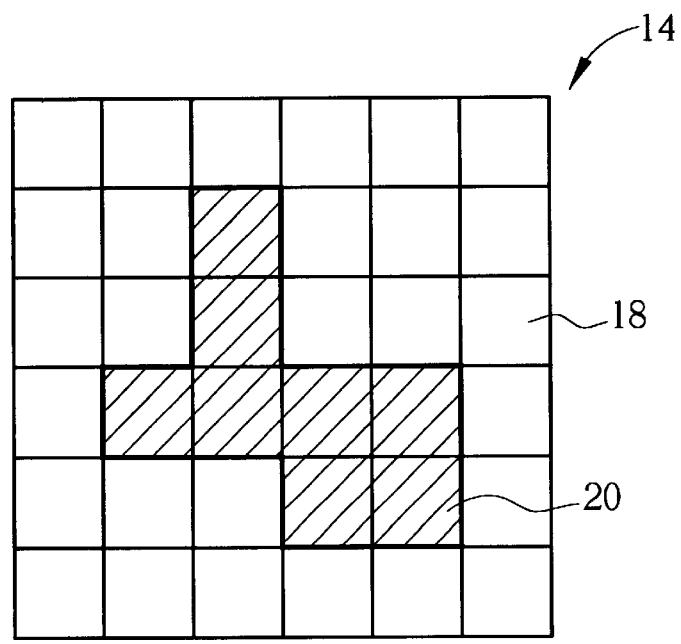
FIG. 2 is a perspective view of a picture image in the image processing system in FIG. 1.
Figure 3:
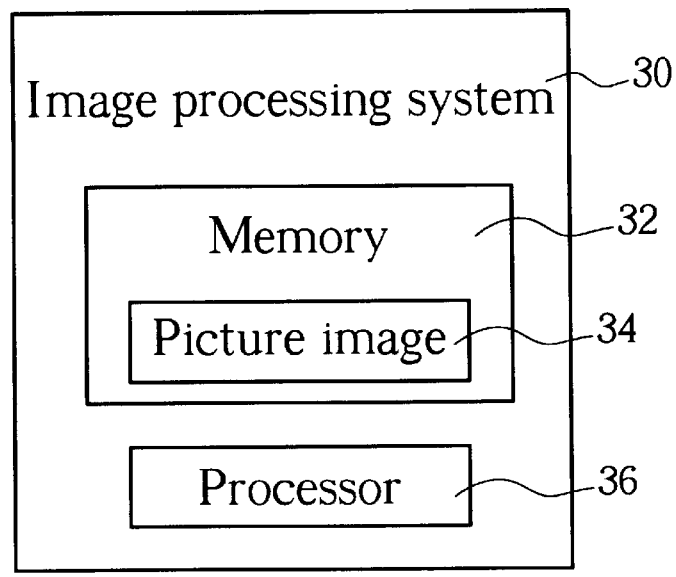
FIG. 3 is a functional block diagram of an image processing system according to the present invention.
Figure 4:
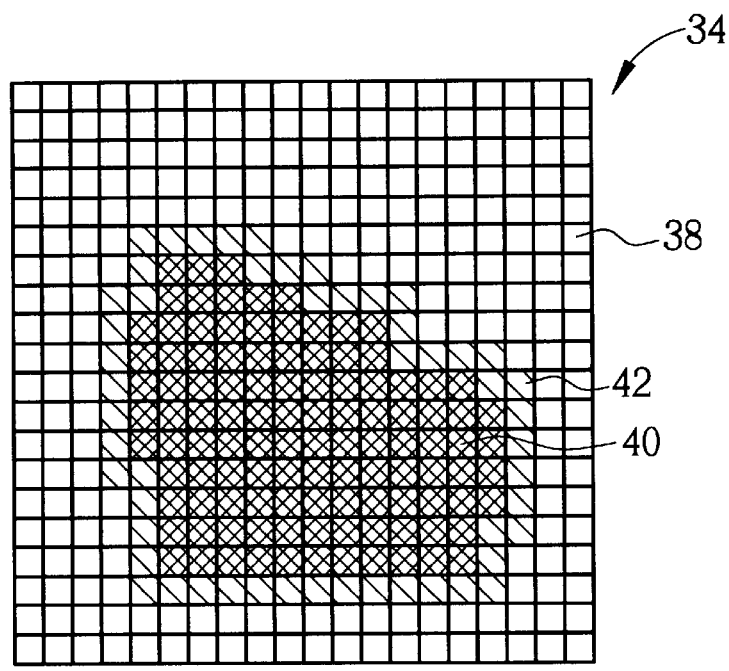
FIG. 4 is a perspective view of a picture image in the image processing system in FIG. 3.

Please refer to FIGS. 3 and 4. FIG. 3 is a functional block diagram of an image processing system 30 according to the present invention. FIG. 4 is a perspective view of a picture image 34 in the image processing system 30. The image processing system 30 comprises a memory 32 for storing programs and a picture image 34, and a processor 36 for executing the programs stored in the memory 32. The picture image 34 comprises a plurality of pixels 38 arranged in a matrix shape. Each of the pixels 38 comprises red, green and blue parameters. The pixels 38 with similar parameters form at least one image area 40.

Figure 5:
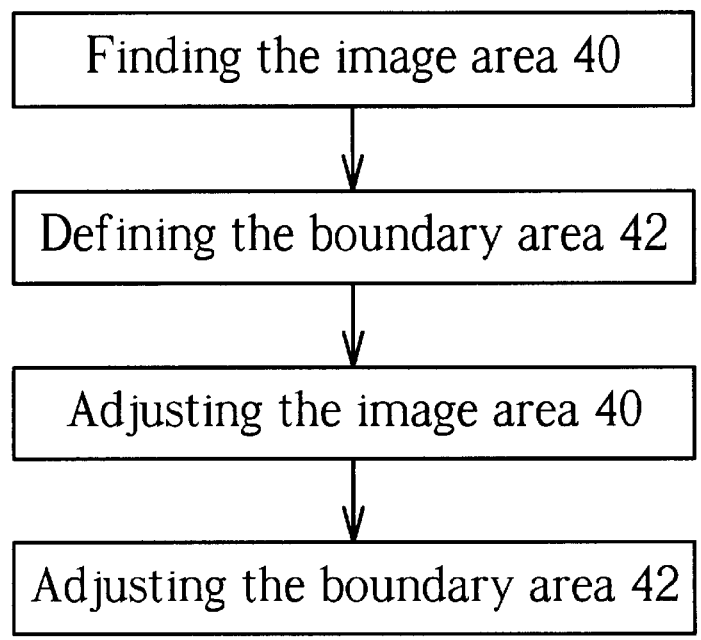
FIG. 5 is a flowchart of an image processing method of the image processing system in FIG. 3.

Please refer to FIG. 5. FIG. 5 is a flowchart of an image processing method for adjusting the color of the image area 40 and smoothing a boundary area 42 of the image area 40 in the image processing system 30. The method comprises the following steps:

1. finding at least one image area 40 with a predetermined characteristic from the picture image 34 according to a predetermined image area detecting method, the predetermined characteristic can be of skin color;
2. defining the boundary area 42 of the image area 40 as an area extended from the boundary of the image area 40 to a predetermined distance;
3. adjusting red, green and blue parameters of each pixel in the image area 40 according to a first color adjusting method;
4. adjusting red, green and blue parameters of each pixel in the boundary area 42 according to a second color adjusting method so that the color adjustment can be extended from the image area 40 to the boundary area 42.

The second color adjusting method is different but similar to the first color adjusting method. The red, green and blue parametersof each pixel to be adjusted in the image area 40 or the first and second color adjusting method can be determined before the image area 40 is found or before the parameters are adjusted.

Figure 6:
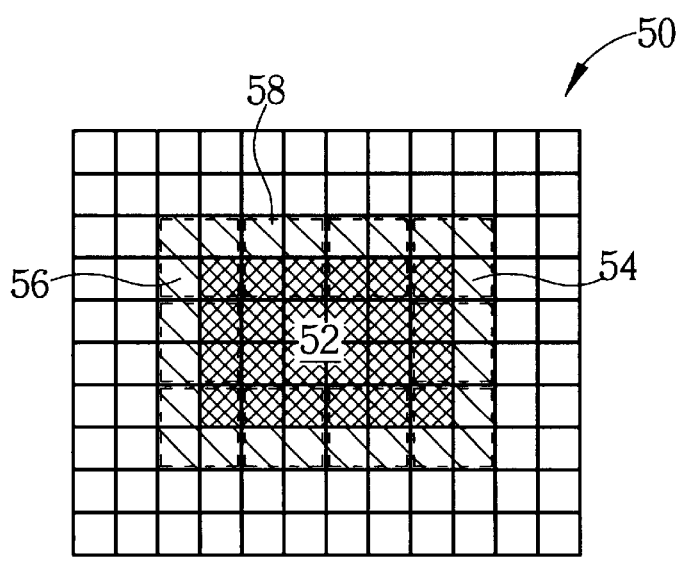
FIG. 6 is a perspective view of another picture image in the image processing system in FIG. 3.

Please refer to FIG. 6. FIG. 6 is a perspective view of another picture image 50 in the image processing system 30. Assuming the image processing system 30 has adjusted the red parameter of each pixel lying inside an image area 52 of the picture image 50, and the red parameter of each pixel lying inside a boundary area 54 is to be adjusted according to a median filtering method (Digital image processing, Rafael G. Gonzalez, Addison Wesley, p.191–195). Then the image processing system 30 will look for the median of the red parameters from four pixels inside the dashed square 56, which includes one pixel in the image area 52 and three pixels in the boundary area 54. And the red parameters of the three pixels lying inside both the boundary area 54 and the dashed square 56 will be replaced by the median. Furthermore, the median of the red parameters of four pixels lying inside the dashed square 58 will be used to replace the red parameters of two pixels lying inside both the boundary area 54 and the dashed square 58 smoothening the red parameters in the boundary area 54 of the image area 52.

When the red parameters of the pixels lying inside the boundary area 54 of the image area 52 are to be adjusted according to a lowpass filtering method (Digital image processing, Rafael G. Gonzalez, Addison Wesley, p.191–195), the red parameters of the three pixels lying inside both the boundary area 54 and the dashed square 56 will be replaced by the average of the red parameters of the four pixels lying inside the dashed square 56. And the red parameters of the two pixels lying inside both the boundary area 54 and the dashed square 58 will be replaced by the average of the red parameters of the four pixels lying inside the dashed square 58. Regardless which method is used to smooth the red parameters of the pixels inside the boundary area 54 of the image area 52, the image processing system 30 will not adjust any pixels not within the boundary area 54.

However, the range of the boundary area 42, 54 of the image area 40, 52 does not have to be limited to a predetermined distance from the boundary of the image area 40, 52. In this case, the color adjustment can still be extended outward from the image area 40, 52. The pixels within the image area 40, 52 and far from its boundary will remain unadjusted. That is, the second color adjusting method should only be applied to areas close to the image areas 40, 52, not throughout the picture image 34, 50.

Compared with the prior art image processing method, the second color adjusting method is only applied to the boundary area 42, 54 of the image area 40, 52 retaining the image not within the boundary area 42, Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An image processing method of an image processing system, the image processing system comprising a memory for storing programs and a picture image, and a processor for executing the programs stored in the memory, the picture image comprising a plurality of pixels, the method comprising:

finding at least one image area with a predetermined characteristic from the picture image according to a predetermined image area detecting method;

defining a boundary area around the image area according to a predetermined boundary area defining method; and adjusting pixels inside the image area according to a first color adjusting method, and adjusting pixels inside the boundary area according to a second color adjusting method without adjusting pixels outside the boundary area so that the second color adjusting method is only applied to the pixels lying inside the boundary area, wherein the second color adjusting method is different but similar to the first color adjusting method.

2. The image processing method of claim 1 wherein the predetermined characteristic is of skin color, the image area detecting method is used to find all image areas with the skin color characteristic.

3. The image processing method of claim 1 wherein each pixel has red, green and blue parameters, the first color adjusting method is used to adjust the red, green and blue parameters of each pixel inside the image area.

4. The image processing method of claim 3 wherein the parameters to be adjusted or the first color adjusting method is determined before the image area is found.

5. The image processing method of claim 3 wherein the parameters to be adjusted or the first color adjusting method is determined before the parameters are adjusted.

6. The image processing method of claim 1 wherein the boundary area is defined as an area extended from the boundary of the image area to a predetermined distance.

7. An image processing method of an image processing system, the image processing system comprising a memory for storing programs and a picture image, and a processor for executing the programs stored in the memory, the picture image comprising a plurality of pixels, the method comprising:

finding at least one image area with a predetermined characteristic from the picture image according to a predetermined image area detecting method;

adjusting pixels inside the image area according to a first color adjusting method; and adjusting pixels outside but near the image area according to a second color adjusting method so that the color adjustment can be extended outward from the image area and the pixels within the image area and far from its boundary will remain unadjusted, wherein the second color adjusting method is different but similar to the first color adjusting method.

8. The image processing method of claim 7 wherein the predetermined characteristic is of skin color, and the image area detecting method is used to find all image areas with the skin color characteristic.

9. The image processing method of claim 7 wherein each pixel has red, green and blue parameters, the first color adjusting method is used to adjust the red, green and blue parameters of each pixel inside the image area.

10. The image processing method of claim 9 wherein the parameters to be adjusted or the first color adjusting method is determined before the image area is found.

11. The image processing method of claim 9 wherein the parameters to be adjusted or the first color adjusting method is determined before the parameters are adjusted.

* * * * *